US009349133B2

(12) United States Patent
Park

(10) Patent No.: US 9,349,133 B2
(45) Date of Patent: May 24, 2016

(54) SYSTEM FOR PROVIDING COUPON SERVICE USING RECEIPTS AND METHOD FOR PROVIDING COUPON SERVICE USING THE SAME

(75) Inventor: Seung-Joon Park, Goyang-si (KR)

(73) Assignees: Seung-Joon Park, Goyang-si (KR); Seunggu Hong, Seoul (KR)

( * ) Notice: Subject to any disclaimer, the term of this patent is extended or adjusted under 35 U.S.C. 154(b) by 756 days.

(21) Appl. No.: 13/127,381

(22) PCT Filed: Oct. 26, 2009

(86) PCT No.: PCT/KR2009/006203
§ 371 (c)(1),
(2), (4) Date: May 3, 2011

(87) PCT Pub. No.: WO2010/053268
PCT Pub. Date: May 14, 2010

(65) Prior Publication Data
US 2011/0225031 A1 Sep. 15, 2011

(30) Foreign Application Priority Data

Nov. 4, 2008 (KR) .................. 10-2008-0108923

(51) Int. Cl.
G06Q 30/00 (2012.01)
G06Q 30/02 (2012.01)
(52) U.S. Cl.
CPC ............ G06Q 30/0224 (2013.01); G06Q 30/02 (2013.01)
(58) Field of Classification Search
CPC .................................. G06Q 30/0224

USPC ....................................... 705/14.25
See application file for complete search history.

(56) References Cited

U.S. PATENT DOCUMENTS

2002/0065712 A1* 5/2002 Kawan ................ G06Q 20/105
70/14.25
2009/0271265 A1* 10/2009 Lay .................... G06Q 20/0453
705/14.38
2010/0306080 A1* 12/2010 Trandal ................ G06Q 10/10
705/26.8

FOREIGN PATENT DOCUMENTS

| KR | 10-2002-0062460 | 7/2002 | |
|---|---|---|---|
| KR | 10-2003-0080752 | 10/2003 | |
| KR | 10-2006-0103088 | 9/2006 | |
| KR | 10-2007-0019923 | 2/2007 | |
| KR | 10-2008-0027698 | 3/2008 | |
| WO | WO 2004077320 A1 * | 9/2004 | ............. G06Q 30/02 |

OTHER PUBLICATIONS

International Search Report-PCT/KR2009/006203 dated Jun. 17, 2010.

* cited by examiner

Primary Examiner — James A Reagan
(74) Attorney, Agent, or Firm — Novick, Kim & Lee, PLLC; Jae Youn Kim

(57) ABSTRACT

Disclosed is a system for providing a coupon service using receipts and a method for providing a coupon service using the same. More specifically, the invention relates to the system and the method that extract coupon information from the image of a receipt provided by a customer or a distribution store in order to accumulate points for a corresponding coupon given to the customer, wherein the consumer and the distribution store are respectively regestered as a member and a member store of the coupon service provider.

11 Claims, 4 Drawing Sheets

SYSTEM FOR PROVIDING COUPON SERVICE USING RECEIPTS AND METHOD FOR PROVIDING COUPON SERVICE USING THE SAME

TECHNICAL FIELD

The present invention relates to a system for providing coupon service using receipts and a method for providing coupon service using the same, and more particularly, to a system for providing coupon service using receipts and a method for providing coupon service using the same which are capable of extracting coupon information from a receipt image provided by a customer registered as a member or a distribution store registered as a member store of the coupon service provider in order to accumulate points for a corresponding coupon given to the customer registered as a member.

BACKGROUND ART

As the level of income has greatly increased, household expenses are rapidly rising in view of range and scale. There happened a large amount of documents that need to keep or manage, such as product purchase receipts, credit card statements, cash receipts, various bills and receipts for utility and tax payment, bills and receipts for apartment maintenance fees, giro papers, insurance policies, and various deal contracts. Under this circumstance, even though there are considerable homes which make existing account book or on-line account book for reasonable household finance, it is difficult to put the purchase information in the account book since many persons frequently purchase various articles at one time in the discount store and often eat out as compared with the past. In other words, upon filling in the account book, it is inconvenient to list all incomes and expenses autobiographically. Further, even in a case of using the computer program, it is inconvenient to enter the purchase information one by one.

From a different point of view, the receipt that the consumer considers not to be important can be often used as an important material. That is, the information contained in the receipt can be used as the important statistical data, from the point of view of the companies of manufacturing and purchasing the products which investigate the statistical material related to consumers' purchasing behavior for their products to improve the marketing decision-making in accordance with the investigated purchasing behavior.

Each company investigates and collects the statistical material related to the consumers' purchasing behavior, by employing his own investigation power to investigate the purchasing behavior directly or requesting a separate investigation agency to investigate it.

However, since the method of investigating it directly do not make the statistical material correct due to a large amount of time and cost as well as insincere answers of the consumers, the company is now using the statistical material produced from the separate investigation agency. For the investigation method (specifically, ad-hoc investigation) which is performed in accordance with a request of the company which requires the statistical material, however, opinion or estimation of the consumers is quiet abstract since the agency asks the consumers for past purchasing experience of a particular product. Therefore, there is a disadvantage in that the consumers' purchasing behavior may not be analyzed in real-time or in long-term trend.

In contrast to it, there is a system based research. This is a factory-made information production method of producing large scale information repetitively, wherein the investigation agency builds the information production system in advance and continuously collects data from the same consumer panels consisted of consumers to produce the purchasing behavior data. Therefore, it is possible to investigate the consumers' purchasing behavior in real time and thereby perform accurate understanding and dynamic analysis of the consumers' purchasing behavior based on repetitive and detailed observation for the same object.

In order to address such problems, there can be used a Patent Registration No. 727402 (registration date: 2007.06.05) applied by the applicant of this invention and titled as "A SYSTEM FOR PROVIDING INFORMATION AND A METHOD OF PROVIDING INFORMATION USING IMAGE DATA OF RECEIPT".

According to the system for providing information and a method of providing information using image data of receipt, if the image data of all kinds of receipts owned by a plurality of panels belonging to a population are provided to the investigation system sever of the information provider, the information provider may provide the storage service of document such as receipts for the panels while extracting the expenses records data of the panels using the image analyzing system. Therefore, it is possible to facilitate providing the marketing information through collection, accumulation, analysis of the information on actual household expenses and purchasing behaviors and make life easier by providing the information on various household expenses and the storage service of the receipts for the panels providing the materials.

Meanwhile, as the market economy increases, many manufacturers and distribution stores are formed and therefore competition occurs more intensely between each other in order to secure the purchasing customers. It has been mainly used in such a manner that a coupon having a point corresponding to a product price printed thereon is attached to the product. When the customer will submit the coupon to the coupon manager upon purchasing the product, the corresponding point is accumulated for the customer.

However, such manner has disadvantages in that the consumers frequently discard the coupon and therefore the coupon product manufacturer wastes a commission charge that has already paid to the coupon manager since it is convenient to directly submit the coupon to the coupon manager after cutting out the coupon and attaching it to a predetermined form upon purchasing the product, and further it is possible not to obtain correct information on customers purchasing the coupon product from the coupon manager and thereby not to enable developing strategic marketing information for product sales.

Further, there is a disadvantage in that it is not possible to check whether the customer submitting the coupon purchases the corresponding product directly, which results that the coupon product manufacturer has a difficulty on marketing.

Therefore, there has been needed an efficient method of allowing the information provider to be provided with the receipts issued to the consumer via the product purchase and understand the consumers' purchasing pattern easily, allowing the customer to accumulate the points for the coupon product to purchase, and allowing the coupon product manufacturer to be provided with information on the consumers using the coupon product and develop more accurate marketing information.

DISCLOSURE

Technical Problem

An object of the present invention is to provide a system for providing a coupon service using receipts and a method for providing a coupon service using the same which are capable of checking whether to purchase the coupon product from receipts provided by the consumer or the distribution store registered as a member of the coupon service provider and keeping on accumulating the points for a corresponding coupon automatically upon purchasing the coupon product, which results that the consumers avoid the inconvenience of needing to submit the coupon and the coupon service provider or the coupon product manufacturer may collect information related to consumers' purchasing behavior thereby developing more accurate marketing information.

Technical Solution

To achieve the object of the present invention, a system for providing a coupon service using receipts according to one aspect of the present invention includes a personal terminal of the consumer which includes an image acquisition unit for acquiring an image of the receipt to receive the image acquired by the image acquisition unit; a coupon product manufacturer server which stores the coupon product information for a product to which a coupon is attached; a coupon service provider server that is connected to the personal terminal and the coupon product manufacturer server through the Internet and includes an operating program to acquire the image data of the receipt and provide point information to consumers; a database server that is connected to the coupon service provider server and stores the coupon product information transmitted from the coupon product manufacturer server, the receipt image provided by the consumer, and the point information extracted from the receipt image; and an image analyzing and processing device that extracts a text from the receipt information provided by the consumer and then extracts the coupon information from the text in order to accumulate points for the corresponding coupon given to the consumer, wherein the points are calculated through the extracted coupon information.

The system for providing a coupon service using receipts according to second aspect of the present invention includes a member store terminal for transmitting the receipt issued to a consumer registered as a member of a coupon service provider; a coupon product manufacturer server for storing the coupon product information of a product to which a coupon is attached; a coupon service provider server which is connected to the member store terminal and coupon product manufacturer server via the internet and includes an operating program to acquire data of the receipt provided from the member store provide the point information to the consumer; a database server which is connected to the coupon service provider server for storing the coupon product information transmitted from the coupon product manufacturer server, the receipt information provided form the member store terminal, and the point information extracted from the receipt information; and an image analyzing and processing device which extracts the coupon information from the receipt information provided by the member store terminal and accumulates the points calculated via the extracted coupon information for the corresponding consumer.

A method for providing a coupon service using receipts to accumulate points for a consumer purchasing a coupon product according to one aspect of the present invention, includes steps of acquiring the image data to upload the image data via the internet and store it on the database server of the coupon service provider server after the consumer generates the image data of the receipt at a personal terminal; and analyzing and processing the image data to extract the coupon product information from the image data of the receipt stored on the database server and accumulate the points for a corresponding coupon given to the consumer.

A method for providing a coupon service using receipts to accumulate points for a consumer purchasing a coupon product according to second aspect of the present invention, includes acquiring the image data to upload the image data via the internet and store it on the database server of the coupon service provider server after the consumer generates the image data of the receipt at a personal terminal; and analyzing and processing the image data to extract the coupon product information from the image data of the receipt stored on the database server and accumulate the points for a corresponding coupon given to the consumer.

Advantageous Effects

The system for providing a coupon service using receipts and the method for providing a coupon service using the same according to the present invention have advantages in that it is possible to check whether to purchase the coupon product from receipts provided by the consumer or the distribution store registered as a member of the coupon service provider and keep on accumulating the points for a corresponding coupon automatically upon purchasing the coupon product, which results that the consumers avoid the inconvenience of needing to submit the coupon and the coupon service provider or the coupon product manufacturer may collect information related to consumers' purchasing behavior thereby developing more accurate marketing information.

Further, the present invention have advantages that the member store registered as a member of the coupon service provider may issue an electronic receipt for the customer in order to reduce the time and the cost that it takes to issue the paper receipt and thereby to improve workers' efficiency, as well as reduce supplies such as receipt paper and ink and thereby reduce a maintenance cost; and the member store may obtain the consumers' purchasing behavior information built by the coupon service provider in order to improve sales efficiency without a need that the store itself builds the Customer Relationship Management CRM with much cost.

DESCRIPTION OF DRAWINGS

The above and other objects, features and advantages of the present invention will become apparent from the following description of preferred embodiments given in conjunction with the accompanying drawings, in which.

DETAILED DESCRIPTION OF MAIN ELEMENTS

Figure 1:
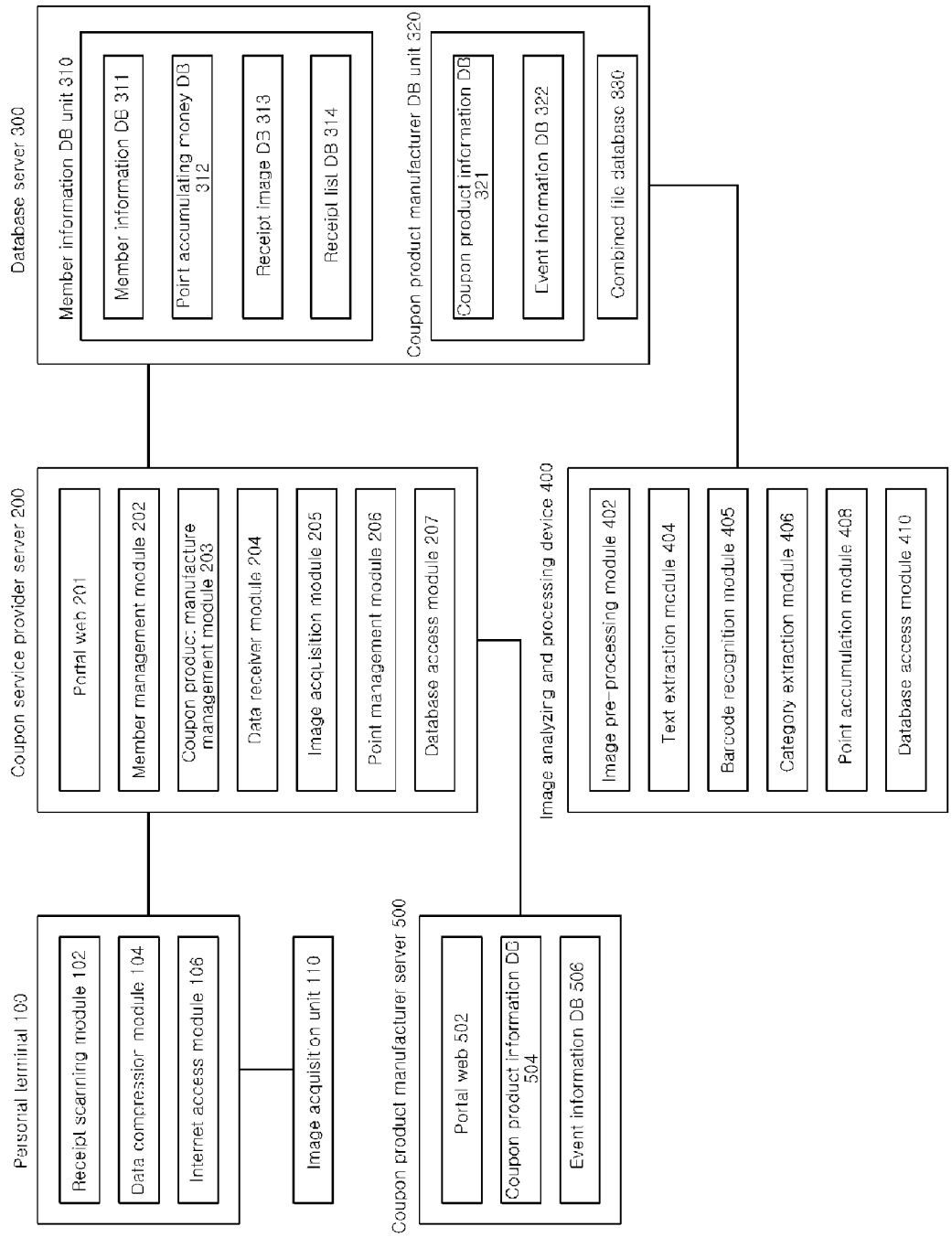
FIG. 1 is a block diagram showing a structure of the system of providing coupon service using receipts according to a first embodiment of the present invention.

100: personal terminal
200, 700: coupon service provider server
300, 800: database server
400, 900: image analyzing and processing device
500, 1000: coupon product manufacturer server
600: member store terminal

[Best Mode]

Hereinafter, the embodiments of the present invention will be described in detail with reference to accompanying drawings.

The present invention is invented based on a Patent Registration No. 727402 (registration date: 2007.06.05) applied by this applicant of the present invention and titled as "A SYSTEM FOR PROVIDING INFORMATION AND A METHOD OF PROVIDING INFORMATION USING IMAGE DATA OF RECEIPT". It will be described hereinafter based on a view of confirming whether to purchase the coupon product through the receipts provided from the consumer or the member store and accumulating points for the corresponding coupon product according to the system for providing a coupon service using receipts and the method for providing a coupon service using the same.

Supposing that the consumers disclosed hereinafter are registered as a member of the coupon service provider server operated by the coupon service provider and the coupon service provider server has already received information on the product to which a coupon is attached, i.e., product name, cost, points and event schedule from the coupon product manufacturer in order to build the database, the present invention will be described hereinafter.

FIG. 1 is a block diagram showing a structure of the system of providing coupon service using receipts according to a first embodiment of the present invention.

Referring to FIG. 1, the system for providing coupon service using receipts according to the present invention includes a personal terminal 100 of the consumer which receives the receipt image acquired by the image acquisition unit 110 acquiring an image of the receipt; a coupon product manufacturer server 500 which stores the coupon product information for a product to which a coupon is attached; a coupon service provider server 200 that is connected to the personal terminal 100 and the coupon product manufacturer sever 500 through the Internet and provides point information to the consumers; a database server 300 that is connected to the coupon service server 200 and stores the coupon product information transmitted from the coupon product manufacturer server 500, the receipt image provided by the consumer, and the point information extracted from the receipt image; and an image analyzing and processing device 400 that extracts a text from the receipt information provided by the consumer and then extracts the coupon information from the text in order to accumulate the points given to the corresponding consumer, wherein the points are calculated through the extracted coupon information.

The personal terminal 100 and the coupon service provider server 200 are provided with a communication interface such as modem for accessing the internet and a suitable communication software, and the personal terminal 100 includes a receipt scanning module 102 which is used for the consumer to convert the receipt into the image data, an image data compression module 104 which enables transmitting the image data via the network, and an internet access module 106 which is used to upload the scanned image data on the coupon service provider server 200 via the internet.

The personal terminal 100 may be used with a computer, a notebook, and a PDA capable of being connected to the internet and the image acquisition unit 110 connected to the personal terminal 100 may be used with a scanner or a digital camera typically used in home or office. Even though the consumer may generate the image data of receipt through the image acquisition unit 110 connected to the personal terminal 100 to provide it to the coupon service provider server 200, the consumer may deliver the receipt to the coupon service provider via a post if he is not provided with separate image acquisition unit 110. Further, the consumer may request the member store of the coupon service provider to deliver the receipt to the coupon service provider and at this time, the member store may deliver the receipts to the coupon service provider via a post, a facsimile or a scanned image data, or even a staff responsible for collecting the receipts in the coupon service provider.

The consumer connects the personal terminal 100 to the coupon service provider server 200 via the internet network so that he may confirm a point accumulation condition stored in the database server 300, request to offer the accumulated point, receive the household expenses information of the consumer, as well as search and output the receipts provided before.

The coupon service provider server 200 includes a portal web 201 for allowing the consumers and the coupon product manufacturer to access the server, a member management module 202 for managing the rights of the consumers to access the server, a coupon product manufacturer management module 203 for managing the rights of the coupon product manufacturer to access the server, a data receiver module 204 for producing the image data of the receipt delivered from the consumers and receiving the coupon product information delivered from the coupon product manufacturer, an image acquisition module 205 for acquiring the image data from the receipt delivered from the consumer or the member store via the post, a point management module 206 for showing the point accumulating condition to the consumer at the time of log-on and receiving a request to offer the accumulating money from the consumers, and a database access module 207 for performing an inquiry to the database server 300.

The coupon service provider server 200 may be connected to a scanner (not shown) for scanning the image of the receipt delivered from the consumer or the member store via the post. In other words, the consumer or the member store may send the paper receipts collected during a predetermined period to the coupon service provider via the post even when not transmitting the image data via the scanning, and the coupon service provider may receive the paper receipt collected and then convert them into the image data via a high scanner or a dedicated scanner.

The database server 300 includes a member information database unit 310 which is configured with a member information database 311 containing personal information of the consumer registered as a member, a point accumulating money database 312 storing points accumulated via the coupon product purchased by the consumer, a receipt image database 313 storing the image of the receipt transmitted by the consumer, and a receipt list database 314 storing as a text, the product list extracted from the image of receipts transmitted by the consumer via the image analyzing and processing device, a coupon product manufacturer database unit 320 which is configured with a coupon product information database 321 for storing the coupon product information provided from the coupon product manufacture, an event information database 322 for storing various event information provided from the coupon product manufacturer, and a combined file database 330 for storing files processed in conformity with a data format required by various external systems.

Herein, in the point accumulating money database 312, the corresponding points for the coupon are accumulated when purchasing the coupon product and the point information cut according to a request of the consumer to offer the points is stored as well. Further, information such as a list of coupon products produced by the manufacturer and points given for the corresponding product are stored in the coupon product information database 321, so that they are called by the image analyzing and processing device 400 and compared with data extracted from the image analyzing and processing device 400 in order to calculate the points.

The image analyzing and processing device 400 includes an image pre-processing module 402 for removing and correcting a noise or a data transform present in the image data, a text extraction module 404 for recognizing and extracting text patterns present in the image data, a category extraction module 406 for extracting the category of each product purchased by the consumer from a series of text files extracted via the text extraction module 404 to extract the coupon product information, a point accumulation module 408 for comparing the coupon product information extracted from the text extraction module 404 with the coupon product information stored in the coupon product information database 321 to calculate the points for the corresponding product, and a database access module 410 for accessing the database server 300 to enable calling and uploading the database stored in the database server 300.

Further, the image analyzing and processing device 400 may be provided with a barcode recognizing module 405 for generating a barcode number from a barcode image contained in an image data of receipts transmitted from the consumer. The barcode image is extracted and transmitted to the barcode recognizing module 405, if it is contained in the image data of the receipt transmitted by the consumer when the text extraction module 404 extracts the text from the image data of the receipt. The barcode recognition module 405 may measure a thickness of the bars or a distance between the bars in the barcode from the barcode image transmitted to generate the barcode number, and then transmit the generated barcode number to the category extraction module 406. Thereafter, the category extraction module 406 compares the barcode number extracted from the text module with the barcode number generated by the barcode recognition module 405 to determine whether the barcode or the barcode number is forged or not. As a result, it is possible to determine whether the image data of the receipts transmitted from the consumer is forged or not, and even whether the image data is doubly transmitted.

The coupon product manufacturer server 500 includes a portal web 502 for accessing the coupon service provider server, a coupon product information database 504 for storing information such as the coupon product list provided to the coupon service provider and points given to the corresponding coupon product, and an event information database 506 for storing the event information for the purpose of promoting the corresponding coupon product.

Herein, the event information database 506 may store information such as distribution stores in which the coupon product promotion event is performed or a point-accumulating rate change at the time of the promoting event. Since the distribution stores may apply accumulation rates different from each other for the point accumulation even though the customers purchase the coupon products having the same point, it is possible to further promote the product.

Figure 2:
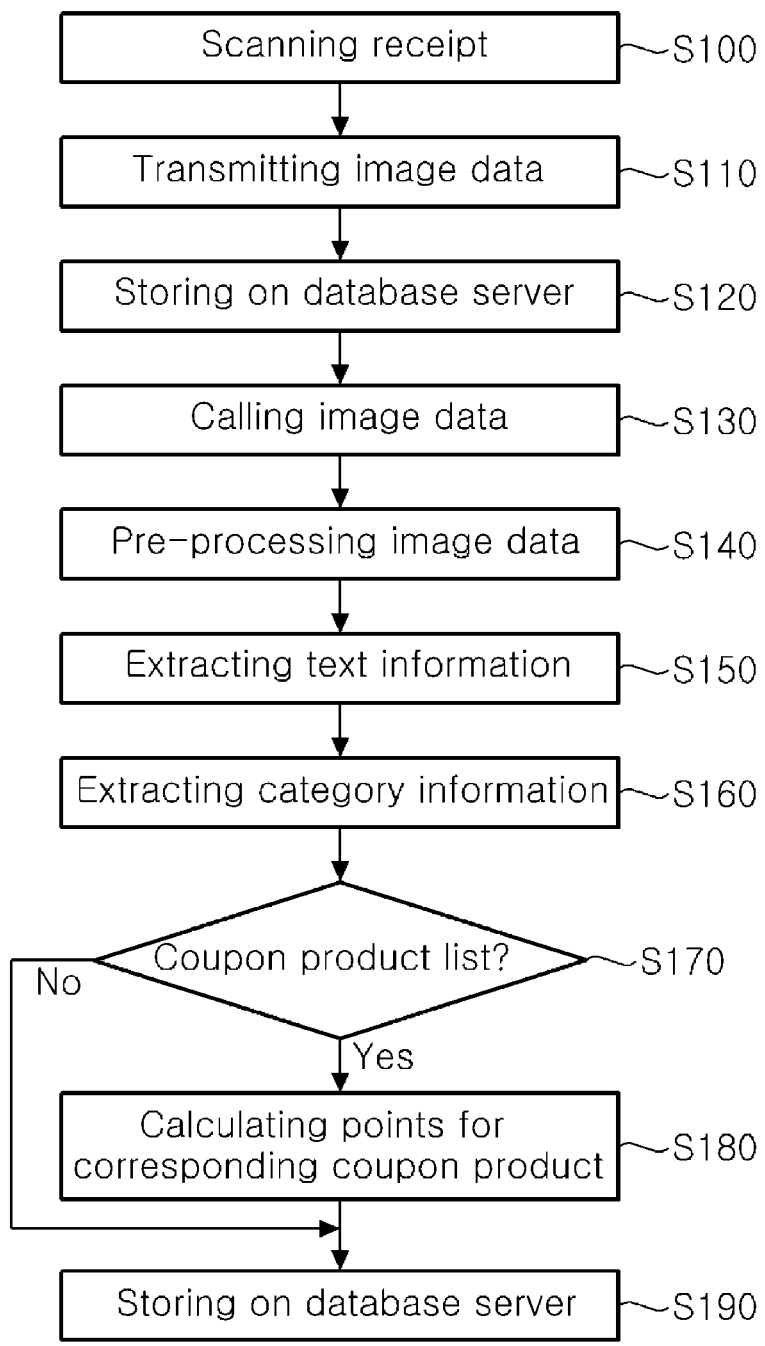
FIG. 2 is a flow diagram showing a procedure of providing points to the consumer using the method of providing coupon service using receipts according to the first embodiment of the present invention.

FIG. 2 is a flow diagram showing a procedure of providing points to the consumer by the method of providing coupon service using receipts according to the first embodiment of the present invention. It will be described hereinafter, in association with the system for providing the coupon service using receipts shown in FIG. 1.

First, the consumer registered as a member of the coupon service provider server 200 acquires the image data of receipt by scanning or imaging the receipt issued after purchasing the product in the distribution store such as a discount store, a gas station, and a bakery through the image acquisition unit 110 connected to the personal terminal 100 (S100), and converts it into the image data compressed using the data compression module 104 to be transmitted to the coupon service provider server 200 via the internet (S110). At this time, the consumer may deliver the receipt to the coupon service provider via the post or the facsimile if he does not hold the image acquisition unit 110, and thereafter the coupon service provider may acquire the image data of the delivered receipt using the image acquisition means connected to the coupon service provider sever 200. Further, if he receives the receipt from the member store of the coupon service provider, he may acquire the image data of receipt using such method.

If the image data of the receipt is transmitted to the coupon service provider server 200, it is stored on the receipt image database 313 of the database server 300 (S120). The image data of the receipt stored in the receipt image database 313 is stored in the database server 300 after extracting the text information and the category information through the image data analyzing step and converting it into information available for the consumer and the coupon service provider.

Such procedures may be performed as follows.

First, the image data of the receipt stored in the receipt image database 313 is called via the database access module 410 of the image analyzing and processing device 400 (S130), and the called image data is then passed through the pre-processing procedure of removing and correcting a noise or a data transform present in the image data using the image pre-processing module 402 (S140), and the text pattern present in the image data is extracted through procedures such as statistic learning and pattern recognition using the text extraction module 404. At this time, if the barcode image is contained in the image data of the receipt transmitted from the consumer, the text extraction module 404 extracts the barcode image to transmit it to the barcode recognition module 405 and the barcode recognition module 405 extracts the barcode number from the barcode image to transmit it to the category extraction module 406.

If the text information is extracted from the image data of the receipt, the category extraction module 406 extracts the category information needed for the coupon service provider (S160). In this step, it is possible to determine the image data of the receipt provided repeatedly from the consumer considering that an unique number such as acknowledgement number is typically contained in the receipt issued from the distribution store, and determine whether the image data is forged and transmitted doubly by comparing the barcode number generated by the barcode recognition module 405 with the barcode number extracted by the text extraction module 404 if the barcode is contained in the image data.

Thereafter, if the category information is extracted, it is compared with the coupon product list stored in the coupon product information database 322 (S170). If the coupon product exists (S170), the extracted category information is stored in the receipt list database 314 and the point accumulation module 408 calculates points for the corresponding product (S180), to store it in the point accumulation money database 312 of the consumer, i.e., a member (S190). Also, in the step S170, it is determined whether the promotion event for a corresponding coupon stored in the event information database 323 exists or not, and the changed point accumulation rate may be delivered to the point accumulation module 408 to be reflected if the promotion event exists.

Meanwhile, if the coupon product does not exist (S170), the extracted category information is stored in the receipt list database 314 (S190) and a series of procedures is ended.

Figure 3:
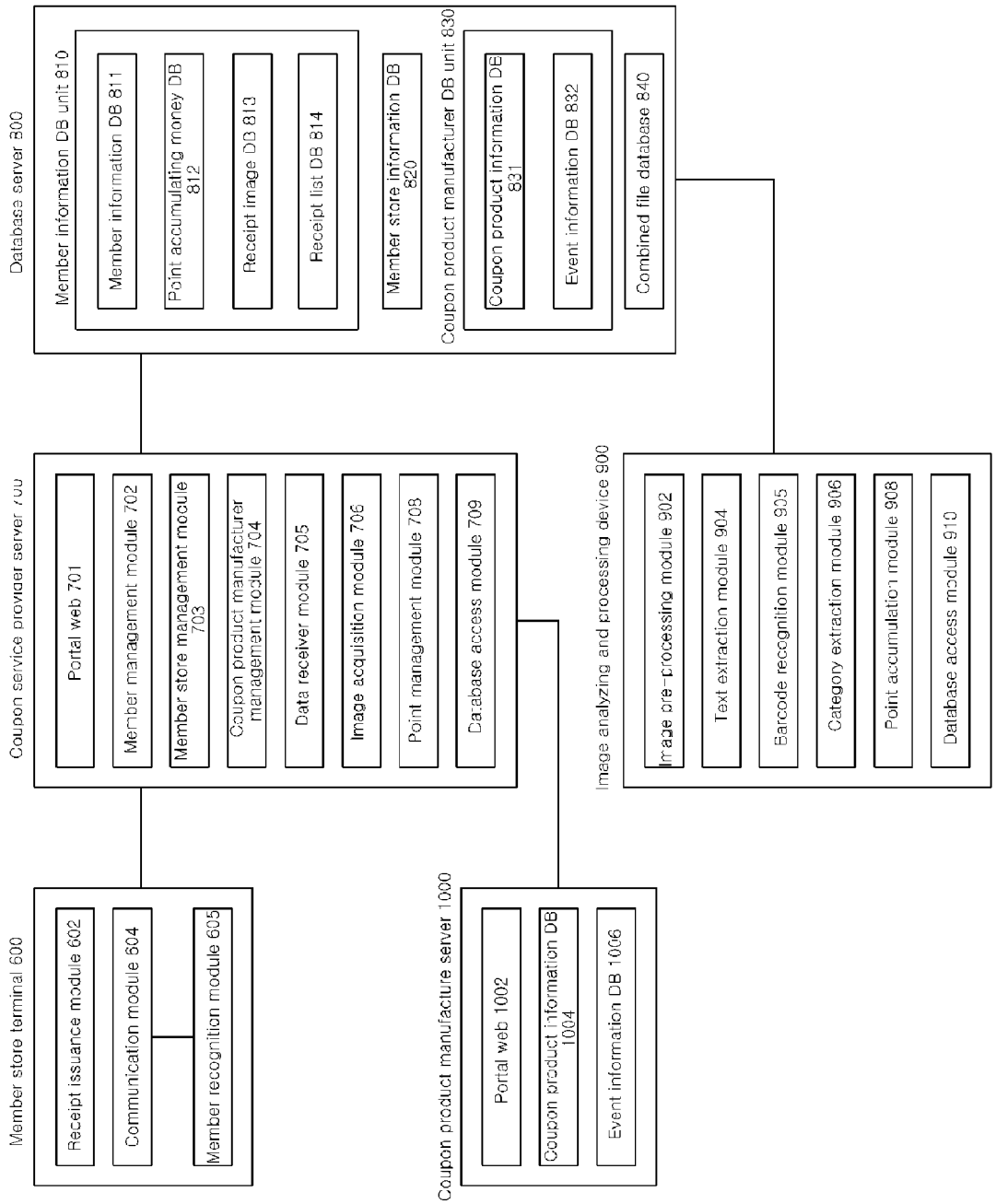
FIG. 3 is a block diagram showing a structure of the system of providing coupon service using receipts according to a second embodiment of the present invention.

FIG. 3 is a block diagram showing a structure of the system of providing coupon service using receipts according to a second embodiment of the present invention.

Referring to FIG. 3, the system for providing the coupon service using receipts according to the present invention includes a member store terminal 600 for receiving the receipt issued for the consumer registered as a member of the coupon service provider, a coupon product manufacturer server 1000 for storing the coupon product information of the product to which a coupon is attached, a coupon service provider server 700 which is connected to the member store terminal 600 and coupon product manufacturer server 1000 via the internet for acquiring data of the receipt provided from the member store providing the point information to the consumer, a database server 800 which is connected to the coupon service provider server 700 for storing the coupon product information transmitted from the coupon product manufacturer server 1000, storing the receipt information provided form the member store terminal 600, and storing the point information extracted from the receipt information, and a image analyzing and processing device 900 which extracts the coupon information from the receipt information provided by the member store terminal 600 and enables accumulating the points calculated via the extracted coupon information for the consumer.

The member store terminal 600 and the coupon service provider server 700 are provided with a communication module 604 having a communication interface such as a modem or a phone line for accessing the internet and suitable communication software and a receipt issuance module 602 for issuing the receipt for the consumer who purchases the product. Herein, the receipt issuance module 602 may issue the receipt or electronic receipt in conformity with a request of the consumer. The electronic receipt may be issued for the consumer, if the consumer is registered as a member of the same coupon service provider as the distribution store and agrees to issue the electronic receipt. Such issued electronic receipt is authorized to have the same legal effect as the paper receipt so that it may be used as materials which resolve troubles related to the purchasing product, such as a money-back, an exchange, and a certification of purchasing fact. Therefore, the coupon service provider may promote the consumers to take the membership of the coupon service provider.

In a case of issuing the electronic receipt via the member store terminal 600, it is possible to reduce the time and the cost that it takes to issue the paper receipt and thereby to improve workers' efficiency, as well as reduce supplies such as receipt paper and ink and thereby reduce a maintenance cost. Further, it is possible to obtain the consumers' purchasing behavior information built by the coupon service provider through joining the coupon service provider and thereby to develop the marketing strategy which is capable of increasing the sales effect.

The communication module 604 is provided with a member authentication module 605 for use in a member authentication if the consumer is registered as a member of the coupon service provider. The member authentication may be performed using a USIM chip embedded in a membership card, a credit card, a check card, a mobile phone and the like which are issued for the consumer registered as a member of the coupon service provider.

The communication module 604 of the member store terminal 600 may transmit the receipt information of the consumer registered as a member of the coupon service provider through communicating with the coupon service provider server 700, and at this time, the receipt information may be transmitted in a form of the electronic receipt consisted of image data or text of the receipt. Further, the member store terminal 600 may reissue the electronic receipt as the paper receipt upon a request from the consumer.

If the consumer authenticated as a member via the member authentication module 605 pays in cash, the communication module 604 may deliver the receipt information for cash payment to a National Tax Service without an additional inquiry.

The member store terminal 600 may be used with a POS terminal which is capable of accessing the internet or the telephone network.

Meanwhile, if the member store terminal 600 issues only paper receipt since it is not connected to the internet or the telephone network, the member store keeps the receipts in place and then delivers them to the coupon service provider via the post or the facsimile, or through a staff responsible for collecting the receipts in the coupon service provider, in accordance with a request from the consumer The coupon service provider server 700 includes a portal web 701 for allowing the consumers and the coupon product manufacturer to access the server, a member store management module 702 for managing the right of the consumers to access the server, a member store management module 703 for managing the right for the member store to access the server, a coupon product manufacturer management module 704 for managing the right of the coupon product manufacturer to access the server, a data receiver module 705 for receiving the image data or electronic receipt information of the receipt transferred from the member store terminal 600 and receiving the coupon product information transferred from the coupon product manufacturer, an image acquisition module 706 for acquiring the image data from the receipt transferred by the consumer or the member store via the post, a point management module 708 for showing the present points condition for the consumer upon a login and receiving a request to pay the accumulating money from the consumer, and a database access module 709 for accomplishing an inquiry to the database server 800.

The coupon service provider server 700 may be connected to a scanner (not shown) for scanning the image of the receipt sent from the consumer or the member store via the post. More specifically, the consumer or the member store capable of scanning the receipt may deliver the receipts collected for a predetermined period via the post. The coupon service provider may receive the paper receipts and then convert them into the image data via a high-speed scanner or a dedicated scanner.

The database server 800 includes a member information database unit 810 which is configured with a member information database 811 containing personal information of the consumer registered as a member, a point accumulation money database 812 for storing points accumulated via the coupon product purchased by the consumer, a receipt image database 813 for storing the image of the receipt transmitted by the consumer, and a receipt list database 814 for storing the product list extracted via the image analyzing and processing device from the image of the receipt transmitted by the consumer, a member store information database 820 for storing an address, a telephone, a business enterprise number of the distribution store registered as a member store of the coupon service provider, a coupon product manufacturer database 830 which is configured with a coupon product information database 831 for storing the coupon product information provided by the coupon product manufacturer, an event information database 832 for storing various event information provided by the coupon product manufacturer, and a combined file database 840 for storing a file processed in conformity with a data format requested by various external systems.

The image analyzing and processing device 900 includes an image pre-processing module 902 for removing and correcting a noise or a data transform present in the image data, a text extraction module 904 for recognizing and extracting text patterns present in the image data, a category extraction module 906 for extracting the category information of each product purchased by the consumer from a series of text files extracted by the text extraction module 904 or the electronic receipt information transmitted from the member store terminal 600 to extract the coupon product information, a point accumulation module 908 for comparing the coupon product information extracted from the text extraction module 904 with the coupon product information stored in the coupon product information database 831 of the database server 800 to accumulate the points for the corresponding product, and a database access module 910 for accessing the database server 800 to enable calling and uploading the database stored in the database server 800.

Further, the image analyzing and processing device 900 can be provided with a barcode recognition module 905 for generating the barcode number from the barcode image contained in the image data of the receipt transmitted from the member store. If the barcode image is contained in the image data of the receipt transmitted from the member store when extracting the text from the image, the barcode image is extracted together and transmitted to the barcode recognition module 905 data of the receipt using the text extraction module 904. The barcode recognition module 905 measures a thickness of the bars or a distance between the bars in the barcode from the barcode image transmitted to generate the barcode number, and then transmits the generated barcode number to the category extraction module 906. Thereafter, the category extraction module 906 compares the barcode number extracted from the text module with the barcode number generated by the barcode recognition module 905 to determine whether the barcode or the barcode number is forged or not. As a result, it is possible to determine whether the image data of the receipts transmitted from the member store is forged or not, and even whether the image data is doubly transmitted.

The coupon product manufacturer server 1000 includes a portal web 1002 for accessing the coupon service provider, a coupon product information database 1004 for storing information such as a coupon product list to be provided to the coupon service provider and points given to the corresponding coupon product, and an event information database 1006 for storing the event information for the purpose of promoting the corresponding coupon product.

Herein, the event information database 1006 may store information such as distribution stores in which the coupon product promotion event is performed or a point-accumulating rate change at the time of the promoting event. Since the distribution stores may apply the accumulating rate different from each other to accumulate points for the consumer even though purchasing the coupon product having the same point, it is possible to further promote the product.

Hereinafter, it will be described on process of accumulating the points given to the consumer which purchases the coupon product using the receipt information transmitted from the member store terminal. Since the points are accumulated via the same process as the first embodiment in a case of delivering the image information of the receipt from the member store terminal, the explanation thereon will be omitted. It will be described only on a process of delivering the electronic receipt information of a text file from the member store terminal.

Figure 4:
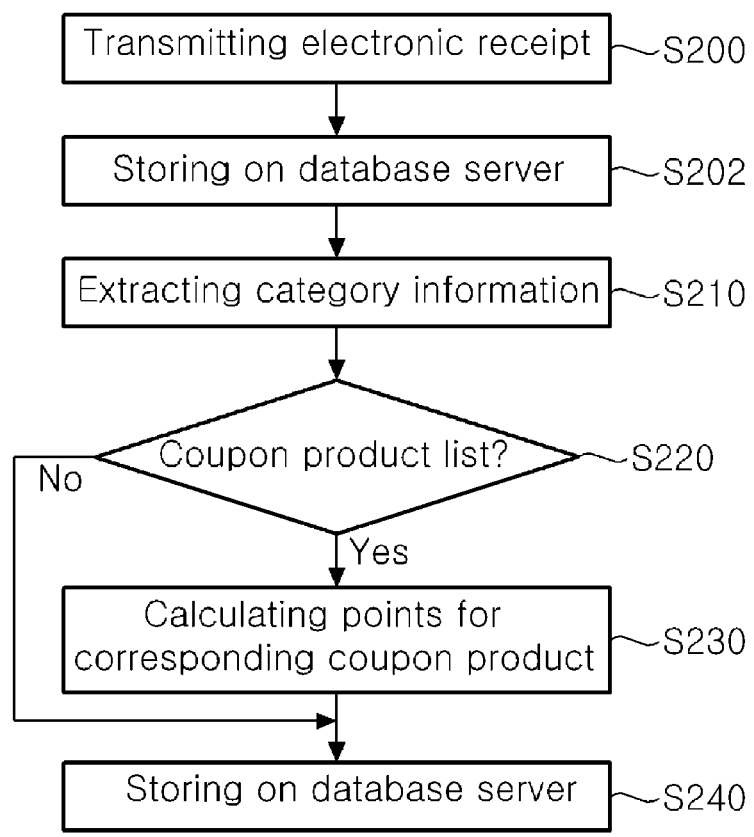
FIG. 4 is a flow diagram showing a procedure of providing points to the consumer using the method of providing coupon service using receipts according to the second embodiment of the present invention.

FIG. 4 is a flow diagram showing a procedure of providing points to the consumer by the method of providing coupon service using receipts according to the second embodiment of the present invention.

If the consumer purchases the product in the member store registered as a member of the coupon service provider and then requests a payment for the purchased product, a store cashier calculates a payment amount for the product and then asks the consumer whether he is a member of the coupon service provider or not.

If the consumer is a member of the coupon service provider and presents the membership card, the credit card, the check card, or a mobile phone having an embedded USIM chip, the cashier accomplishes a member authentication via the member authentication module 605 and the communication module 604 of the member store terminal 600 and makes inquiry about a form of the receipt to issue.

If the consumer requests to issue the electronic receipt, he accomplishes issuing the electronic receipt and delivering it to the coupon service provider server 700 via the communication module 604 (S200). At this time, if the consumer pays in cash, it is possible to deliver the receipt information for cash payment to a National Tax Service in conformity with a request of the consumer without confirming additional personal information.

Thereafter, the coupon service provider 700 stores the electronic receipt information transmitted from the member store terminal 600 on the receipt list database 814 of the database server 800 (S202).

Since the electronic receipt information is transmitted in a text file upon receiving the electronic receipt information from the member store terminal 600, it is possible to omit the image processing procedure or the text extraction procedure.

Therefore, the image analyzing and processing device 900 calls the electronic receipt information from the receipt list database 814 via the database access module 910, and extracts the category information needed for the coupon service provider from the electronic receipt information called via the category information extraction module 906 (S210). In this step, it is possible to determine whether the electronic receipt information is forged or doubly transmitted via a unique number of the receipt, such as acknowledgment number contained in the electronic receipt information.

If the category information is extracted, it is compared with the coupon product list stored in the coupon product information database 831. If the coupon product exists (S220), the extracted category information is stored in the receipt list database 814 again and the point accumulation module 908 calculates the points for the corresponding product (S230), to store them on the point accumulating money database 812 of the consumer, i.e, the member (S240). At this time, in the step S220, it is determined whether there exists the promotion event for the corresponding coupon stored in the event information database 832. If the promotion event exists, the changed point accumulation rate is delivered to the point accumulation module 908 so that it may be reflected.

Meanwhile, if the coupon product does not exist (S220), the extracted category information is stored in the receipt list database 814 (S240) and a series of procedures is ended.

While the present invention has been described with respect to the specific embodiment, it will be apparent to those skilled in the art that various changes and modifications may be made without departing from the spirit and scope of the invention as defined in the following claims.

INDUSTRIAL APPLICABILITY

According to the system for providing a coupon service using receipts and the method for providing a coupon service using the same, there are advantages in that it is possible to check whether to purchase the coupon product from receipts provided by the consumer or the distribution store registered as a member of the coupon service provider and keep on accumulating the points for a corresponding coupon automatically upon purchasing the coupon product, to cause the consumers to need not to submit the coupon as well as cause the coupon service provider or the coupon product manufacturer to collect information related to consumers' purchasing behavior thereby developing more accurate marketing information. Further, the present invention have advantages that the member store registered as a member of the coupon service provider may issue an electronic receipt for the customer in order to reduce the time and the cost that it takes to issue the paper receipt thereby improving workers' efficiency, as well as reduce supplies such as receipt paper and ink thereby reducing a maintenance cost; and the member store may obtain the consumers' purchasing behavior information built by the coupon service provider in order to improve sales efficiency without a need that the store itself builds the Customer Relationship Management CRM with much cost.

The invention claimed is:

1. A system for providing coupon service using receipts, comprising:
   a communications network including the internet;
   a first personal terminal of a first consumer connected to the communications network, the first personal terminal including a first image acquisition unit having a scanner or a digital camera, the first image acquisition unit configured to acquire an image of a first receipt for having purchased a particular product from a first store, the first personal terminal configured to transmit the image acquired by the first image acquisition unit through the communications network;
   a first member store terminal of the first store connected to the communications network, the first member store terminal configured to receive and transmit the image of the first receipt to a government agency through the communications network for collecting taxes from the first consumer for having paid for the particular product in cash;
   a second personal terminal of a second consumer connected to the communications network, the second personal terminal including a second image acquisition unit having a scanner or a digital camera the second image acquisition unit configured to acquire an image of a second receipt for having purchased the same particular product from a second store, the second personal terminal configured to transmit the image acquired by the second image acquisition unit through the communications network;
   a second member store terminal of the second store connected to the communications network, the second member store terminal configured to receive and transmit the image of the second receipt to the government agency through the communications network for collecting taxes from the second consumer for having paid for the particular product in cash;
   a coupon product manufacturer server connected to the communications network, the coupon product manufacturer server configured to store coupon product information for the particular product to which a coupon is attached and event information specifying different point-accumulating rates for purchasing the same particular product at the first and second stores;
   a coupon service provider server connected to the personal terminals and the coupon product manufacturer server through the communications network, the coupon service provider server including an operating program configured to acquire image data of the receipts and to provide point information to the consumers;
   a database server connected to the coupon service provider server through the communications network, the database server configured to receive and store the coupon product information and the event information transmitted from the coupon product manufacturer server, the receipt images provided by the personal terminals, and the point information extracted from the receipt images; and
   an image analyzing and processing device configured to extract texts from receipt information provided by the personal terminals and to extract coupon information and the event information from the texts in order to accumulate a first quantity of points for the first consumer and a second different quantity of points for the second consumer, the points calculated based on the extracted coupon information and the extracted event information, the image analyzing and processing device comprising:
      a text extraction module configured to recognize and extract text patterns present in image data, the text pattern including a first barcode number;
      a barcode recognition module configured to extract a barcode image and to generate a second barcode number from the extracted barcode image; and
      a category extraction module configured to extract category information of each product purchased by a consumer from a series of text files extracted via the text extraction module, to extract coupon product information, to receive the first barcode number from the barcode recognition module, and to compare the first barcode number with a second barcode number extracted by the text extraction module in order to determine whether the image data is forged.

2. The system of claim 1, wherein a receipt is provided from a distribution store registered as a member of the coupon service provider operating the coupon service provider server via one of a post and a scanned image data.

3. The system of claim 1, wherein the coupon service provider server comprises:
   a portal web configured to allow consumers and the coupon product manufacture to access the coupon service provider server;
   a member management module configured to manage a right of a consumer to access the coupon service provider server;
   a coupon product manufacturer management server configured to manage a right of the coupon product manufacturer to access the coupon service provider server;

a data receiver module configured to receive image data of receipts from the personal terminals and coupon product information from the coupon product manufacturer;

an image acquisition module configured to acquire image data from receipts delivered from consumers via a post;

a point management module configured to show points accumulated upon log-in and to manage points; and a database access module configured to enable access to the database server and inquiry to the database.

4. The system of claim 1, wherein the database server comprises:

a membership information database configured to contain personal information of a consumer registered as a member;

a point accumulation money database configured to store points accumulated via the coupon product purchased by a consumer;

a receipt image database configured to store an image of a receipt transmitted by a personal terminal;

a receipt list database configured to store, as a text, a product list extracted from an image of the receipt transmitted by a personal terminal via the image analyzing and processing device;

a coupon product information database configured to store coupon product information provided by the coupon product manufacturer;

an event information database configured to store various event information provided by the coupon product manufacturer; and a combined file database configured to store file processed in conformity with a data format requested by various external systems.

5. The system of claim 1, wherein the image analyzing and processing device further comprises:

an image pre-processing module configured to remove and correct at least one of a noise and a data transform present in image data;

a point accumulation module configured to accumulate points for a corresponding consumer via coupon product information from the text extraction module and coupon product information stored in the database server; and a database access module configured to access the database server to call and upload a database of the database server.

6. A system for providing coupon service using receipts, comprising:

a first member store terminal of a first member store, the first member store terminal configured to transmit a first receipt issued to a first consumer registered as a member of a coupon service provider for purchasing a particular product at the first member store and to transmit the first receipt to a government agency for collecting taxes from the first consumer for having paid for the particular product in cash;

a second member store terminal of a second member store, the second member store terminal configured to transmit a second receipt issued to a second consumer registered as a member of the coupon service provider for purchasing the same particular product at the second member store, to transmit the second receipt to the government agency for collecting taxes from the second consumer for having paid for the particular product in cash;

a coupon product manufacturer server configured to store coupon product information of the particular product to which a coupon is attached and event information specifying different point-accumulating rates for purchasing the same particular product at the first and second member stores;

a coupon service provider server connected to the member store terminals and the coupon product manufacturer server via the Internet, the coupon service provider server including an operating program configured to acquire data of the receipts provided from the member stores and to provide point information to the consumers;

a database server connected to the coupon service provider server, the database server configured to store the coupon product information and the event information transmitted from the coupon product manufacturer server, receipt information provided from the member store terminals, and the point information extracted from the receipt information; and an image analyzing and processing device configured to extract coupon information and the event information from the receipt information provided by the member store terminals and to accumulate a first quantity of points calculated based on the extracted coupon information and the extracted event information for the first consumer and a second different quantity of points calculated based on the extracted coupon information and the extracted event information for the second consumer, the image analyzing and processing device comprising:

a text extraction module configured to recognize and extract text patterns present in image data, the text pattern including a first barcode number;

a barcode recognition module configured to extract a barcode image and to generate a second barcode number from the extracted barcode image; and a category extraction module configured to extract category information of each product purchased by a consumer from a series of text files extracted via the text extraction module, to extract coupon product information, to receive the first barcode number from the barcode recognition module, and to compare the first barcode number with a second barcode number extracted by the text extraction module in order to determine whether the image data is forged.

7. The system of claim 6, wherein a member store terminal is configured to issue one of a paper receipt and an electronic receipt.

8. The system of claim 6, wherein a member store terminal is configured to transmit receipt information including at least one of a receipt image and a text to the coupon service provider server.

9. The system of claim 6, wherein the coupon service provider server comprises:

a portal configured to allow consumers and the coupon product manufacturer to access the coupon service provider server;

a member management module configured to manage a right for a consumer to access the coupon service provider server;

a member store management module configured to manage a right for a member store to access the coupon service provider server;

a coupon product manufacturer management module for managing a right of the coupon product manufacturer to access the coupon service provider server;

a data receiver module configured to receive the receipt information transferred from the member store terminals and receive the coupon product information transferred from the coupon product manufacturer server;

an image acquisition module configured to acquire the image data from a receipt transferred by a member store via the post;

a point management module configured to show the accumulated points upon log-in and to manage points; and a database access module configured to enable an access to the database server and an inquiry to the database server.

10. The system of claim 6, wherein the database server comprises:

a member information database configured to contain personal information of a consumer registered as a member, a point accumulation money database configured to store points accumulated via the coupon product purchased by a consumer, a receipt list database configured to store, as a text, a product list extracted via the image analyzing and processing device from receipt information transmitted from a member store terminal;

a member store information database configured to contain information of a member store;

a coupon product information database configured to store the coupon product information provided by the coupon product manufacturer;

an event information database configured to store various event information of the coupon product manufacturer; and a combined file database configured to store a file processed in conformity with a data format requested by various external systems.

11. The system of claim 6, wherein the analyzing and processing device comprises:

an image pre-processing module configured to remove and correct at least one of a noise and a data transform present in the image data;

a point accumulation module configured to accumulate the points for a corresponding consumer via coupon product information from the text extraction module and coupon product information stored in the database server; and a database access module configured to access the database server to enable calling and uploading a database of the database server.

* * * * *